Nov. 9, 1954 — W. H. BUSHNELL — 2,693,853
HOLE CUTTING TOOL
Filed Sept. 19, 1950
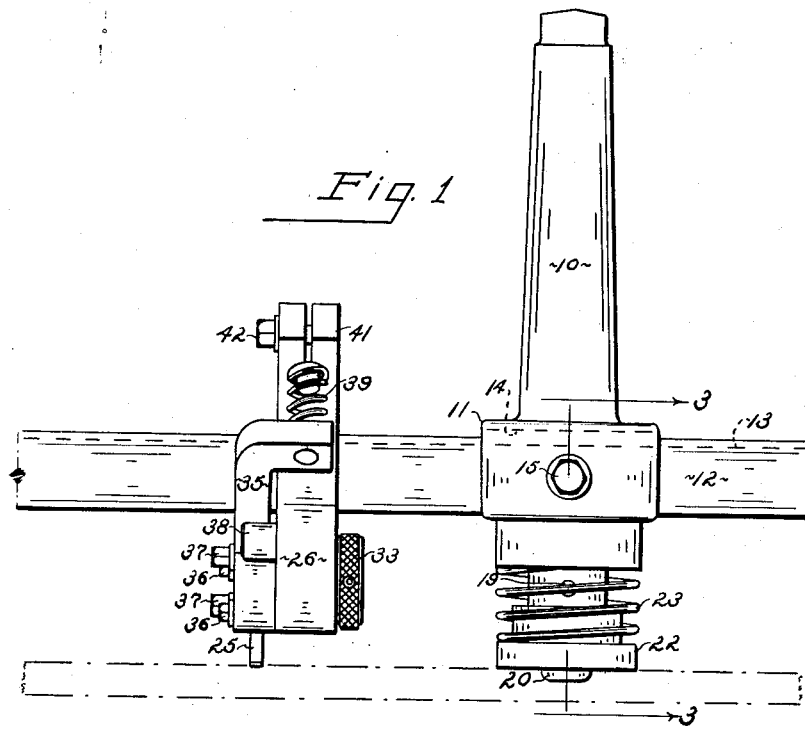
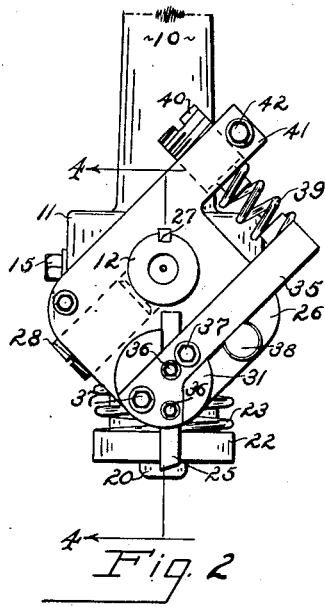
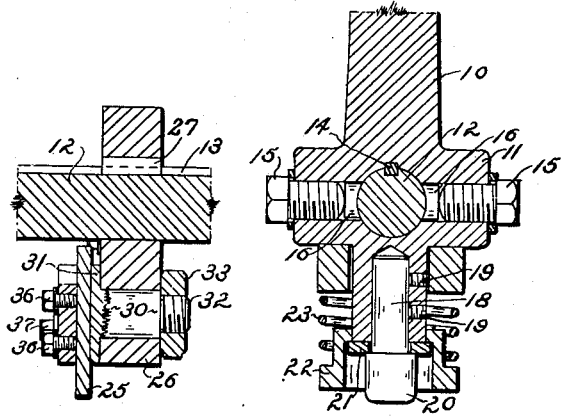
INVENTOR.
WILLIAM H. BUSHNELL
BY Bodell & Thompson
ATTORNEYS

United States Patent Office 2,693,853
Patented Nov. 9, 1954

2,693,853

HOLE CUTTING TOOL

William H. Bushnell, Liverpool, N. Y., assignor to Samuel Grant Bloomer and William H. Bushnell, a co-partnership doing business as Master Hole Cutter Company, Syracuse, N. Y.

Application September 19, 1950, Serial No. 185,525

6 Claims. (Cl. 164—71)

This invention relates to a hole cutting tool and more particularly to that type of tool wherein the cutter is caused to rotate about the axis of the hole, the cutter or cutters having a single tooth or cutting lip, whereby the hole is formed by removing a disk from the work piece.

In cutters of this type, there is great possibility that the cutting edge of the cutter will break through the work at a particular point, causing the cutter to catch or hog in. This situation often results in breakage of the cutter, damage to the work piece, or injury to the operator or machine driving the cutter.

This invention has as an object a hole cutting tool, of the type referred to, embodying a structure which functions to automatically release the cutter from cutting engagement in the event any undue strain is developed on the cutter.

The invention has as a further object a hole cutting tool embodying a novel structure by which the tool bit or cutter is rigidly supported except for the release function, whereby the tool operates free from chatter and is particularly well adapted for cutting holes to precision dimensions.

The invention consists in the novel features and in the combinations and constructions hereinafter set forth and claimed.

In describing this invention, reference is had to the accompanying drawings in which like characters designate corresponding parts in all the views.

Figure 1 is a side elevational view of a hole cutting tool embodying my invention.

Figure 2 is an end elevational view looking to the right, Figure 1.

Figure 3 is a sectional view taken on line 3—3, Figure 1.

Figure 4 is a sectional view taken on line 4—4, Figure 2.

The tool comprises a driving post provided at its upper end with a shank portion 10 adapted to be operatively connected to the spindle of a drill press or other machine tool driving element. The post is formed with an enlarged portion 11 at the base of the shank and which is provided with a transversely extending aperture to slidably receive a bar 12. The bar is formed with a key way 13 extending axially thereof for the reception of a key 14 to prevent rotation of the bar in the driving post. The bar 12 is secured in adjusted position by screws 15 acting upon clamp blocks 16. The lower end of the driving post is apertured to receive a pilot member 18 detachably secured in the post, as by set screws 19. The lower end portion 20 of the pilot is of slightly enlarged diameter and abuts against a retaining washer 21 extending radially from the lower end of the post and serving as a fixed stop for a collar 22 slidably mounted on the post and yieldingly pressed against the washer 21 by compression coil spring 23. The head portion 20 of the pilot depends slightly below the end face of the collar 22, as shown in Figure 3, so that it may readily enter a pilot hole initially formed in the work piece.

The cutter or tool bit 25 is mounted in a supporting member journalled in a block 26 apertured to receive the bar 12 and being adjustable axially on the bar toward and from the driving post. The block 26 is fixedly secured to the bar 12 as by a key 27 positioned in the way 13 of the bar and a set screw 28 threaded into the block and engaging the bar 12. The support for the cutter 25 is in the form of a pin 30 journalled in the block on an axis extending parallel to the bar 12. This pin is formed with an enlarged head portion 31 at one end and has an externally threaded reduced portion 32 at its opposite end forming a shouldered portion on which nut 33 is threaded, all whereby the pin is mounted in the block for rotation relatively thereto.

The head portion 31 is formed with a transversely extending slot in which the cutter bit 25 is mounted. The head is formed with a second slot extending in angular relation to the slot in which the cutter bit is mounted. An arm 35 is mounted in the second slot and overlies the cutter bit 25 and is provided with set screws 336 engaging the cutter bit and fixedly securing it in its slot. The arm 35 is detachably secured to the head portion 31 of the pin as by screws 37.

The arm 35 extends radially from the pin and is normally positioned against a stop 38 by a coil compression spring 39 interposed between the free end of the arm and an adjusting screw 40 threaded into an extension 41 formed on the block 26, see Figures 1 and 2. The free end of the arm is bent in angular relation to line up with the screw 40, and the screw is locked in adjusted position by a clamp screw 42.

Referring to Figure 2, the driving post is rotated to move the block 26 to the left whereby the cutting action of the tool bit 25 tends to rotate the pin 30 in a counter-clockwise direction, Figure 2, against the yielding force of the spring 39. The opposing force exerted by the spring 39 is sufficient to maintain the arm 35 against the stop 38 during cutting engagement of the cutter with the work piece. This pressure will vary with the width of the cutting face of the tool bit, the material being operated upon etc., and is determined by the adjustment of the screw 40.

As the tool post is moved axially downwardly to effect feeding of the cutter 25 into the work, the collar 22 resting upon the work piece has relative axial movement in relation to the driving post and in a direction toward the bar 12. This arrangement aids materially in preventing chatter of the cutter or hogging into the work piece.

It will be apparent that the diameter of the hole being cut depends upon the distance the block 26 is adjusted on the bar 12 from the driving post.

This tool has proven to be particularly advantageous over tools of this type now in use, especially in cutting holes in relatively thin and tough sheet metal.

What I claim is:

1. A hole cutting tool of the type described comprising a driving post adapted for rotation about the axis of the hole being cut and having a shank portion and a depending pilot portion, a bar extending radially from the axis of said post intermediate said shank and pilot portion, a block slidably mounted on said bar for movement toward and from said post, said block having a portion depending from the bar, a pin rotatably journalled in the depending portion of the block on an axis parallel to said bar, clamping means for detachably securing a cutter to said pin with the cutting edge of said cutter depending from the axis of said pin, an arm secured to said pin and extending radially therefrom, and adjustable spring means cooperable with said arm for yieldingly restraining rotation of said pin by the cutter during the cutting operation.

2. A hole cutting tool of the type described comprising a driving post adapted for rotation about the axis of the hole being cut and having a shank portion and a depending pilot portion, a bar extending radially from the axis of said post intermediate said shank and pilot portion, a block slidably mounted on said bar for movement toward and from said post, said block having a portion depending from the bar, a cutter support rotatably journalled in the depending portion of the block on an axis parallel to said bar, a cutter mounted on said support and depending therefrom, a longitudinal edge of said cutter being coplanar with the axis of said support, an arm mounted on the support and extending radially therefrom, means for detachably securing said cutter and arm to the support, and means cooperable with said arm for yieldingly restraining rotation of said support by the cutter during the cutting operation.

3. A hole cutting tool of the type described comprising a driving post adapted for rotation about the axis of the hole being cut and having a shank portion and a depending pilot portion, a bar extending radially from the axis of said post intermediate said shank and pilot portion, means operable to secure said bar from rotation relative to said post, a block slidably mounted on said bar for movement toward and from said post, means operable to secure said block from rotation relative to said bar, said block having a portion depending from the bar, a cutter support rotatably journalled in the depending portion of the block on an axis parallel to said bar, said support comprising a pin having a head portion formed with a radial slot, a cutter mounted in said slot and depending from said support, means operable to detachably clamp the cutter in said slot, an arm secured to the support and extending radially therefrom, and means cooperable with the arm for yieldingly restraining rotation of said support by the cutter during the cutting operation.

4. A hole cutting tool of the type described comprising a driving post adapted for rotation about the axis of the hole being cut and having a shank portion and a depending pilot portion, a bar extending radially from the axis of said post intermediate said shank and pilot portion, a block slidably mounted on said bar for movement toward and from said post, said block having a portion depending from the bar, a cutter support rotatably journalled in the depending portion of the block on an axis parallel to said bar, said support comprising a pin having a head portion formed with radial slots extending in angular relation, a cutter positioned in one slot, an arm positioned in the other slot and overlying the cutter, means for detachably securing said arm to the head, said arm having means to detachably secure the cutter in the first slot, and means cooperable with said arm for yieldingly restraining rotation of said pin by the cutter during the cutting operation.

5. A hole cutting tool of the type described comprising a driving post adapted for rotation about the axis of the hole being cut and having a shank portion and a depending pilot portion, a bar extending radially from the axis of said post intermediate said shank and pilot portion, a block slidably mounted on said bar for movement toward and from said post, means operable to secure said bar and block from rotation relative to each other and to said post, said block having a portion depending from the bar, a cutter support rotatably journalled in the depending portion of the block on an axis parallel to said bar, said support comprising a pin having a head portion formed with radial slots extending in angular relation, a cutter positioned in one slot, an arm positioned in the other slot and overlying the cutter, means for detachably securing said arm to the head, said arm having means to detachably secure the cutter in the first slot, a stop engaging the arm to position the cutter in cutting relation, and means cooperable to yieldingly maintain said arm in engagement with said stop during the cutting operation.

6. In a hole cutting tool, a driving post adapted for rotation about the axis of the hole being cut, a bar extending radially from the axis of said post, a block slidably mounted on said bar for movement toward and from said post, said block having a portion depending from the bar, a pin rotatably journalled in the depending portion of said block, said pin having a head portion formed with a radial slot, a cutter positioned in said slot and depending from said head portion, an arm secured to said head portion and overlying the cutter in said slot, said arm extending radially from the head portion in angular relation to the cutter, and adjustable spring means interposed between said block and arm and being operable to yieldingly restrain rotation of said pin by the cutter during the cutting operation.

References Cited in the file of this patent

UNITED STATES PATENTS

| Number | Name | Date |
|---|---|---|
| 733,821 | Dixon | July 14, 1903 |
| 1,834,143 | Callard et al. | Dec. 1, 1931 |
| 1,924,717 | Hall | Aug. 29, 1933 |
| 1,966,962 | Horhorouny | July 17, 1934 |
| 2,269,510 | Bates | Jan. 13, 1942 |
| 2,330,577 | Hampf | Sept. 28, 1943 |
| 2,505,236 | Dooley (filed Oct. 4, 1946) | Apr. 25, 1950 |

FOREIGN PATENTS

| Number | Country | Date |
|---|---|---|
| 604,494 | Great Britain | July 5, 1948 |